US012194748B2

(12) United States Patent
Kawaguchi et al.

(10) Patent No.: US 12,194,748 B2
(45) Date of Patent: Jan. 14, 2025

(54) IMAGE FORMING APPARATUS

(71) Applicant: KYOCERA Document Solutions Inc., Osaka (JP)

(72) Inventors: Shinichi Kawaguchi, Osaka (JP); Hiroshi Yokota, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 148 days.

(21) Appl. No.: 18/162,796

(22) Filed: Feb. 1, 2023

(65) Prior Publication Data

US 2023/0256741 A1 Aug. 17, 2023

(30) Foreign Application Priority Data

Feb. 7, 2022 (JP) ................................ 2022-016961

(51) Int. Cl.
*B41J 2/165* (2006.01)

(52) U.S. Cl.
CPC ......... *B41J 2/16526* (2013.01); *B41J 2/1652* (2013.01); *B41J 2/16552* (2013.01); *B41J 2/16579* (2013.01)

(58) Field of Classification Search
CPC .. B41J 2/16526; B41J 2/1652; B41J 2/16552; B41J 2/16579
See application file for complete search history.

(56) References Cited

U.S. PATENT DOCUMENTS

2005/0122362 A1* 6/2005 Hasebe ................ B41J 2/04558 347/19

FOREIGN PATENT DOCUMENTS

JP 2005-096116 4/2005
JP 2005096116 A * 4/2005

* cited by examiner

*Primary Examiner* — Justin Seo
(74) *Attorney, Agent, or Firm* — LEX IP MEISTER, PLLC

(57) ABSTRACT

A conveying belt has a plurality of flushing openings and a detection hole, and the plurality of flushing openings are arranged in at least two rows along the main scanning direction. Furthermore, the discharge timing controller (a) detects a position of the detection hole in the main scanning direction with a belt sensor, (b) identifies the flushing opening corresponding to the nozzle based on the position of the detected detection hole in the main scanning direction, and (c) causes the print engine to perform flushing of the nozzle at a timing corresponding to the flushing opening.

4 Claims, 9 Drawing Sheets

IMAGE FORMING APPARATUS

INCORPORATION BY REFERENCE

This application is based upon, and claims the benefit of priority from, corresponding Japanese Patent Application No. 2022-016961 filed in the Japan Patent Office on Feb. 7, 2022, the entire contents of which are incorporated herein by reference.

BACKGROUND OF THE INVENTION

Field of the Invention

The present disclosure relates to an image forming apparatus.

Description of Related Art

In inkjet recording devices such as inkjet printers, drying ink tends to clog nozzles of recording heads thereof due to thickening of ink. Therefore, flushing is performed to discharge and discard the thickened ink. In some image forming apparatus, holes corresponding to the size of a unit recording head in the recording heads are provided on the conveying belt, and ink is discharged through the holes to perform flushing.

There is a case where, during a circulating movement of the conveying belt, the conveying belt is misaligned in the main scanning direction (perpendicular to the conveying direction and along the width direction of the conveying belt). If the conveying belt is being misaligned in the main scanning direction, ink discharged by flushing may not be accurately discarded downward through the above mentioned holes and hit the conveying belt, it results in possible contamination of it.

The present disclosure was made in view of the above circumstances, and an object of the present disclosure is to obtain an image forming apparatus capable of properly performing flushing even if the conveying belt is misaligned in the main scanning direction when flushing is performed through flushing openings formed on the conveying belt.

SUMMARY OF THE INVENTION

An image forming apparatus according to the present disclosure includes: a conveying belt to convey a print sheet; a print engine including a plurality of nozzles arranged in a main scanning direction to discharge ink from the nozzles onto the print sheet; and a discharge timing controller to control an ink discharge timing of the print engine. The conveying belt may have a plurality of flushing openings and a detection hole, and the plurality of flushing openings may be arranged in at least two rows along the main scanning direction. The discharge timing controller may (a) detect a position of the detection hole in the main scanning direction with a sensor, (b) identify the flushing opening corresponding to the nozzle based on the position of the detected detection hole in the main scanning direction, and (c) cause the print engine to perform flushing of the nozzle at a timing corresponding to the flushing opening.

DETAILED DESCRIPTION

Hereinafter, embodiments according to the present disclosure will be explained with reference to drawings.

First Embodiment

Figure 1:
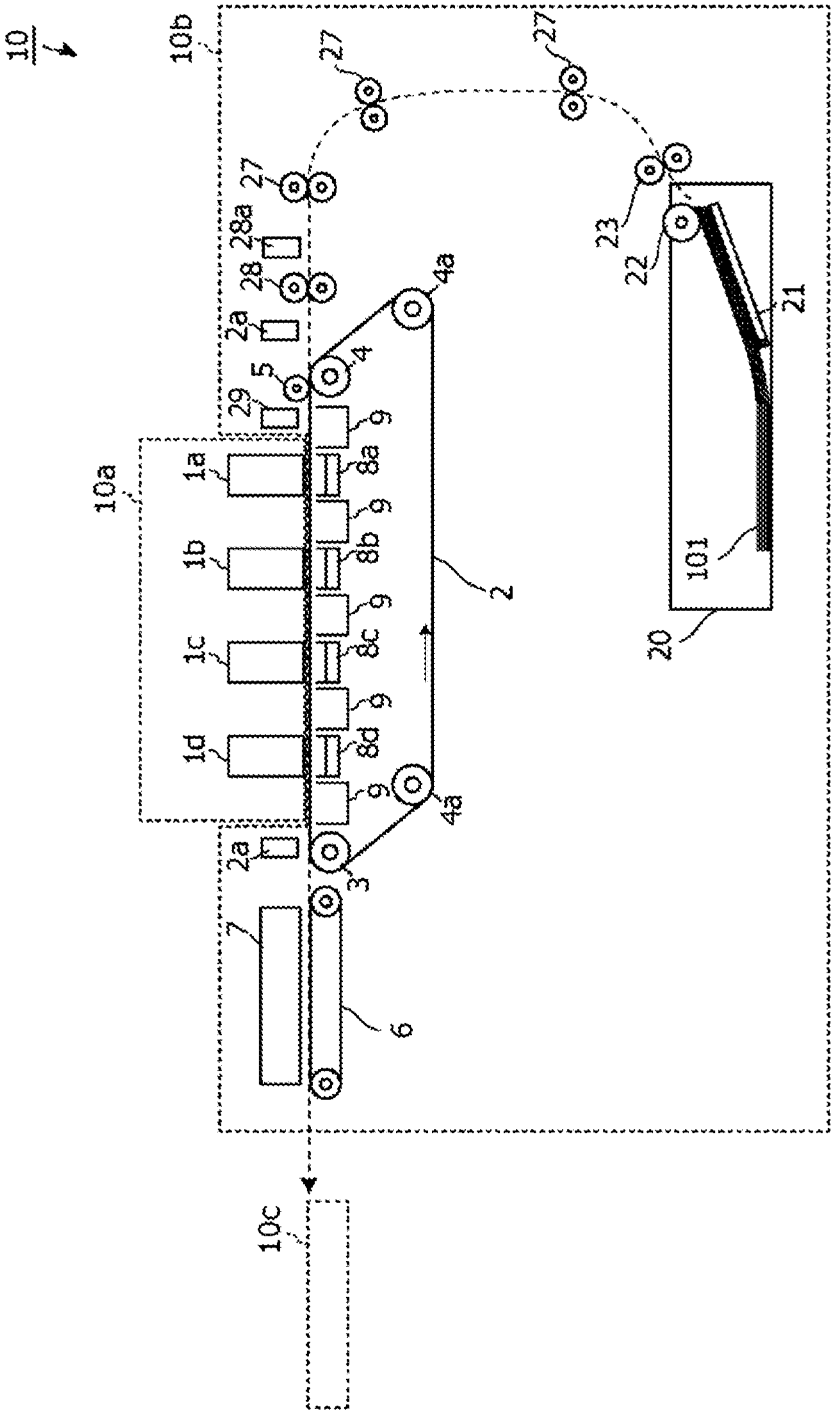
FIG. 1 shows a side view illustrating an internal mechanical configuration of an image forming apparatus according to an embodiment of the present disclosure.
Figure 2:
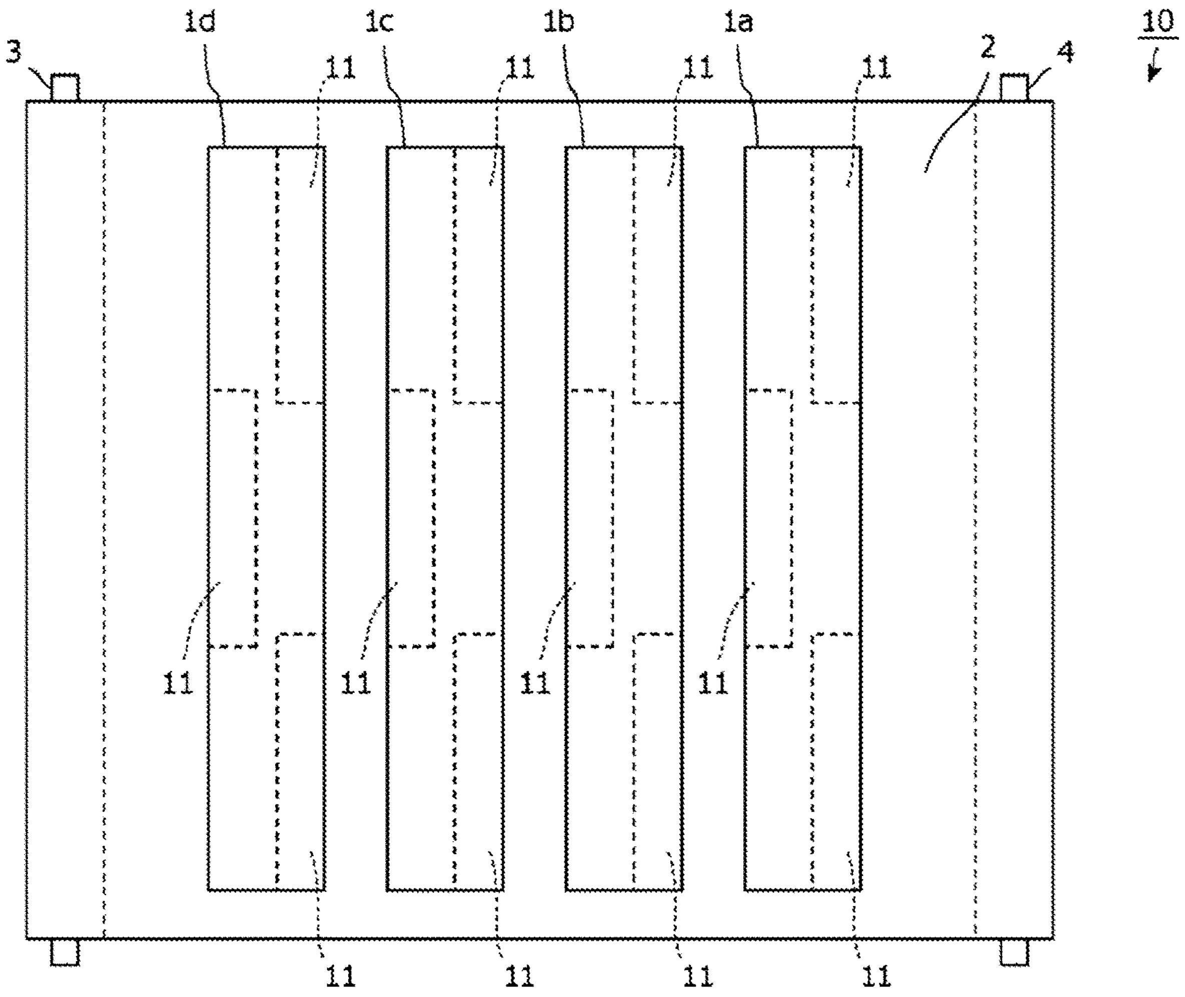
FIG. 2 is a plan view of the image forming apparatus shown in FIG. 1.

FIG. 1 shows a side view illustrating an internal mechanical configuration of an image forming apparatus according to an embodiment of the present disclosure. FIG. 2 shows a plan view of an image forming apparatus illustrated in FIG. 1.

The image forming apparatus 10 according to the present embodiment is an apparatus such as a printer, copier, facsimile machine, multifunction machine, and in the present embodiment it has a line-head-type inkjet color printing mechanism.

The image forming apparatus 10 shown in FIG. 1 has a print engine 10_a_ and a sheet conveyor 10_b_. The print engine 10_a_ physically prints an image to be printed onto a print sheet (e.g., paper for printing). An ink cartridge is detachable to/from the print engine 10_a_, and the print engine 10_a_ performs print using ink supplied from ink cartridge. The sheet conveyor 10_b_ conveys the print sheet to the print engine 10_a_.

In the present embodiment, the print engine 10_a_ has a line-head-type inkjet recording parts 1_a_-1_d_ corresponding to four ink colors which are cyan, magenta, yellow, and black, and inkjet recording parts 1_a_-1_d_ discharge ink onto the print sheet.

As shown in FIG. 2, in the present embodiment, each of inkjet recording parts 1_a_, 1_b_, 1_c_, and 1_d_ has one or more (here three) head sections 11. Those head sections 11 are arranged along the main scanning direction so as to be detachable to/from the apparatus body. The head section 11 (i.e., each of inkjet recording parts 1_a_, 1_b_, 1_c_, and 1_d_) has a plurality of nozzles arranged in the main scanning direction and discharges ink from the nozzles onto the print sheet.

In the present embodiment, the sheet conveyor 10_b_ has a conveying belt 2 positioned facing the print engine 10_a_ and conveys a print sheet, a drive roller 3, a driven roller 4, and a tension roller 4_a_ on which the conveying belt 2 is suspended, a suction roller 5 nipping the print sheet together with the conveying belt 2, a rear conveying belt 6, and a dryer 7.

The drive roller 3, driven roller 4, and tension roller 4*a* circulate the conveying belt 2. The suction roller 5 nips the print sheet conveyed from a paper feeding cassette 20 described below, and the nipped print sheet 101 is conveyed in turn by the conveying belt 2 to print positions of inkjet recording parts 1*a* to 1*d*, on which respective color images are printed by inkjet recording parts 1*a* to 1*d*. At this time, a sheet sensor 2*a* detects passage of the print sheet, and a current position of the print sheet on a convey path is identified based on the detection timing, thereby printing the image at an appropriate position on the print sheet. Then, the print sheet which has been printed is ejected by the rear conveying belt 6 to the ejection tray 10*c*, etc. At this time, the print sheet on which ink has been discharged is dried by the dryer 7.

Figure 3:
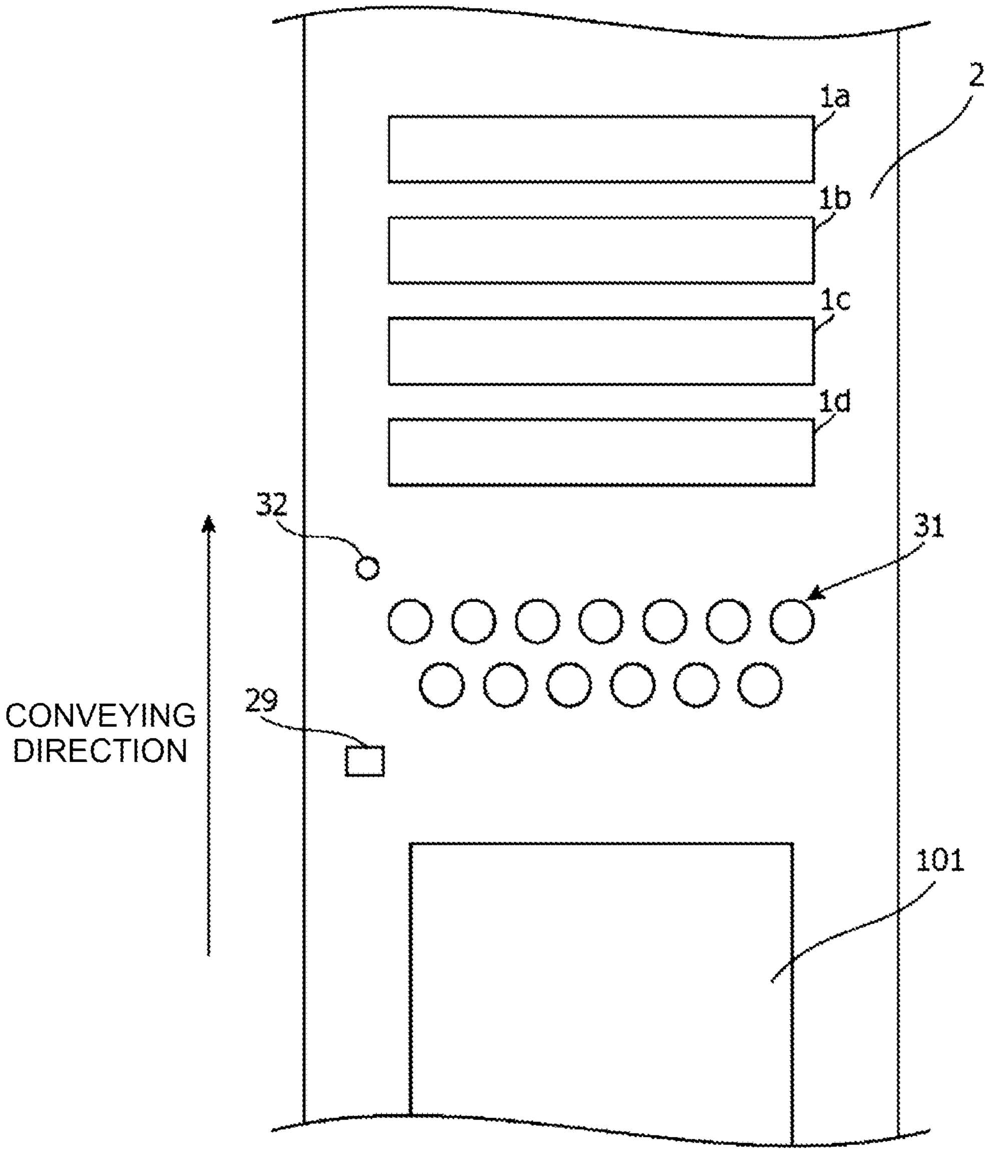
FIG. 3 is a diagram illustrating an example of a conveying belt 2 in FIG. 1.

FIG. 3 shows an example of the conveying belt 2 shown in FIG. 1. The conveying belt 2 has a plurality of flushing openings 31. For example, as shown in FIG. 3, a plurality of flushing openings 31 are formed in the conveying belt 2, and the flushing openings 31 are arranged in at least two rows (two rows in FIG. 3) along the main scanning direction. In other words, there are flushing openings 31 which are located at different positions from each other in the conveying direction. The plurality of flushing openings 31 are arranged so as to cover the entire range of the plurality of nozzles arranged in inkjet recording parts 1*a* to 1*d* in the main scanning direction (i.e., so that there is no flushing opening that does not correspond to the nozzle).

Sheet suction holes are arranged uniformly in a specific density in areas other than the flushing openings 31.

For example, as shown in FIG. 1, ink receiving parts 8*a* to 8*d* are provided below the head sections 11 of the inkjet recording parts 1*a* to 1*d*, respectively. Flushing (e.g., line flushing) for each of the nozzles in each of inkjet recording parts 1*a*, 1*b*, 1*c*, and 1*d* is performed when any of the flushing openings 31 is positioned directly below any of the head sections 11 of inkjet recording parts 1*a*, 1*b*, 1*c*, and 1*d*, and ink discharged from the nozzles during flushing is received by the corresponding ink receiving parts 8*a*, 8*b*, 8*c*, and 8*d* through the flushing openings 31 and collected into a waste ink tank.

In addition, the sheet suction parts 9 are arranged along a sheet conveying path in areas other than the ink receiving parts 8*a* to 8*d*. Negative pressure is applied to the sheet suction parts 9, thereby sucking the print sheet onto the conveying belt 2 through the sheet suction holes. A lower negative pressure than the sheet suction parts 9 is applied to the ink receiving parts 8*a* to 8*d*.

Furthermore, the sheet conveyor 10*b* has a paper feeding cassette 20 as a paper feed source. The paper feeding cassette 20 accommodates print sheets 101, and a lifting plate 21 pushes the print sheets 101 upward to bring it into contact with a pickup roller 22. The print sheets 101 mounted on the paper feeding cassette 20 are picked up by the pickup roller 22 and fed to a paper feeding roller 23 one by one from the top of the bunch of the print sheets 101. The paper feeding roller 23 conveys the print sheets 101 fed by the pickup roller 22 from the paper feeding cassette 20 on the conveying path one by one.

The conveying roller 27 conveys the print sheet 101 on a specific conveying path. When a print sheet 101 being conveyed is detected by the resist sensor 28*a*, a resist roller 28 pauses the print sheet 101 and conveys the print sheet 101 to the print engine 10*a* (specifically, to a nip position between the suction roller 5 and the conveying belt 2) at a secondary paper feeding timing. The secondary paper feeding timing is designated by a controller 81 described below so that an image is formed at the designated position on that print sheet 101.

In addition, a belt sensor 29 is provided above the conveying belt 2. The belt sensor 29 is an optical sensor such as a line sensor positioned along the main scanning direction, for example, detects reflected light obtained by irradiating light onto the conveying belt 2 by an LED, etc. with each light receiving element such as a photodiode, and identifies the color at each position within a specific range in the main scanning direction.

Furthermore, the conveying belt 2 has a detection hole 32. The detection hole 32 is formed in order to detect the position (misalignment amount) of the conveying belt 2 in the main scanning direction, as described below. In the conveying direction, the detection hole 32 is located before a leading flushing opening 31.

The detection hole 32 (image thereof) is detected by the belt sensor 29 in a different color than the surface of the conveying belt 2 (image thereof), and the position (misalignment amount) of the conveying belt 2 in the main scanning direction is identified based on the position of the detection hole 32 (image thereof).

As shown in FIG. 3, for example, the width of inkjet recording parts 1*a*, 1*b*, 1*c*, and 1*d* (i.e., the width of the nozzle arrangement) is more than that of the print sheet 101, and the width of arrangement of the flushing openings 31 is more than that of inkjet recording parts 1*a*, 1*b*, 1*c*, and 1*d*.

Figure 4:
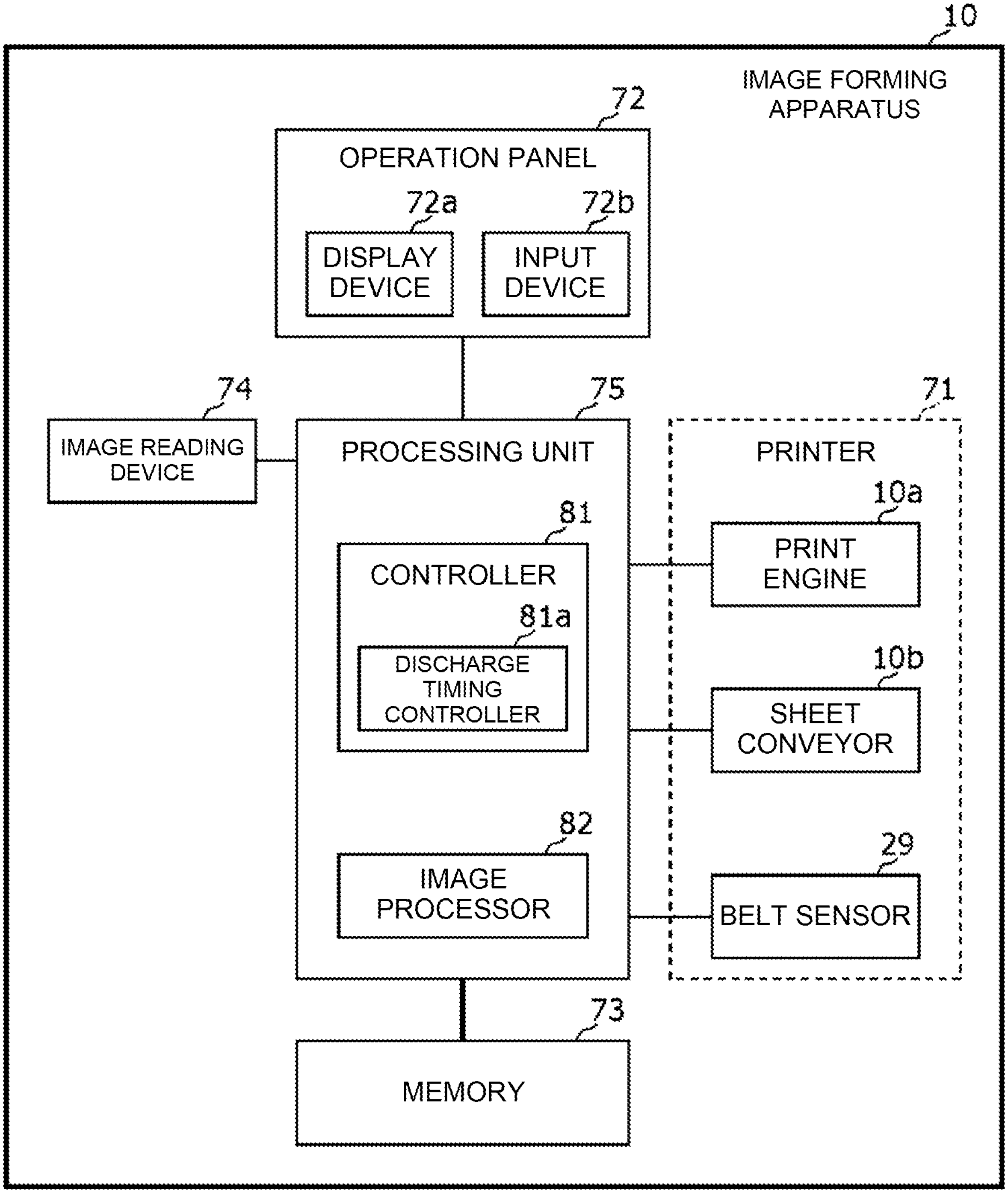
FIG. 4 is a block diagram illustrating an electric configuration of the image forming apparatus according to the embodiment of the present disclosure.

FIG. 4 shows a block diagram illustrating an electric configuration of the image forming apparatus 10 according to the embodiment of the present disclosure. As shown in FIG. 4, in addition to the print apparatus 71, which has the mechanical configuration shown in FIGS. 1 and 2, the image forming apparatus 10 further has an operation panel 72, a storage device 73, an image reading device 74, and a processing unit 75.

The operation panel 72 is located on the surface of a chassis of the image forming apparatus 10 and has a display device 72*a* such as a liquid crystal display, and an input device 72*b* such as a hard key and a touch panel, in which the display device 72*a* displays various messages to the user and the input device 72*b* accepts user's operation.

The storage device 73 is a nonvolatile memory such as a flash memory, a hard disk drive, etc. to store data, programs, etc. necessary for controlling the image forming apparatus 10.

The image reading device 74 has a platen glass and an automatic document feeder, and optically reads out an image of a document placed on the platen glass or being conveyed by the automatic document feeder, and generates image data of the image.

The processing unit 75 includes a computer which operates in accordance with a program, an ASIC (Application Specific Integrated Circuit) or the like which performs a specific operation, and operates as sorts of processors. The computer includes a CPU (Central Processing Unit), a ROM (Read Only Memory), a RAM (Random Access Memory) and the like, and operates as sorts of processors (together with ASIC where necessary) by loading a program into the RAM from the ROM, the storage device 73 or the like and executing the programs by the CPU.

Here, the processing unit 75 operates as the controller 81 and the image processor 82.

The controller 81 controls the print apparatus 71 (print engine 10*a*, sheet conveyor 10*b*, etc.) and executes print jobs requested by the user. In the present embodiment, the controller 81 causes the image processor 82 to perform a specific image process and controls print engine 10*a* (head section 11) to discharge ink to form a print image on the print sheet. The image processor 82 performs a specific image process, such as RIP (Raster Image Processing), color conversion, and halftoning, over the image data of an image to be printed on the print sheet.

The controller 81 causes the print apparatus 71 to print out the image designated by the user. Specifically, the controller 81 causes the print engine 10*a* to print out a user's document image based on print image data designated by the user. The controller 81 causes the print engine 10*a* to discharge ink when printing the user's document image.

Furthermore, the controller 81 has a discharge timing controller 81*a* to control an ink discharge timing of the print engine 10*a*. The discharge timing controller 81*a* causes the print engine 10*a* to discharge ink from each nozzle at the flushing timing corresponding to each nozzle of the print engine 10*a*. This flushing is performed in order to discard ink thickened in the nozzle.

Figure 5:
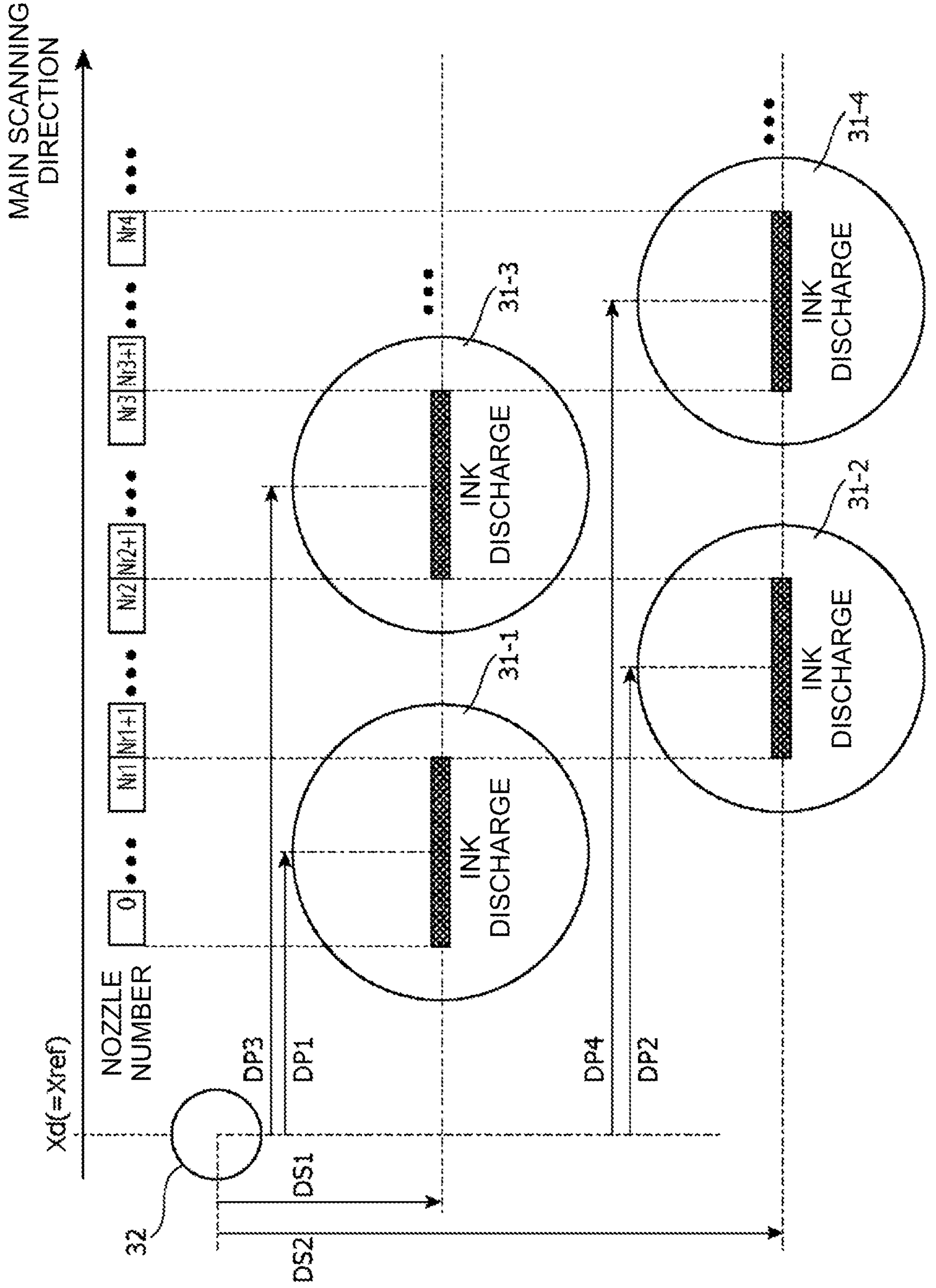
FIG. 5 is a diagram explaining identification of flushing openings corresponding to each nozzle, which continues to FIG. 6 (1/2)
Figure 6:
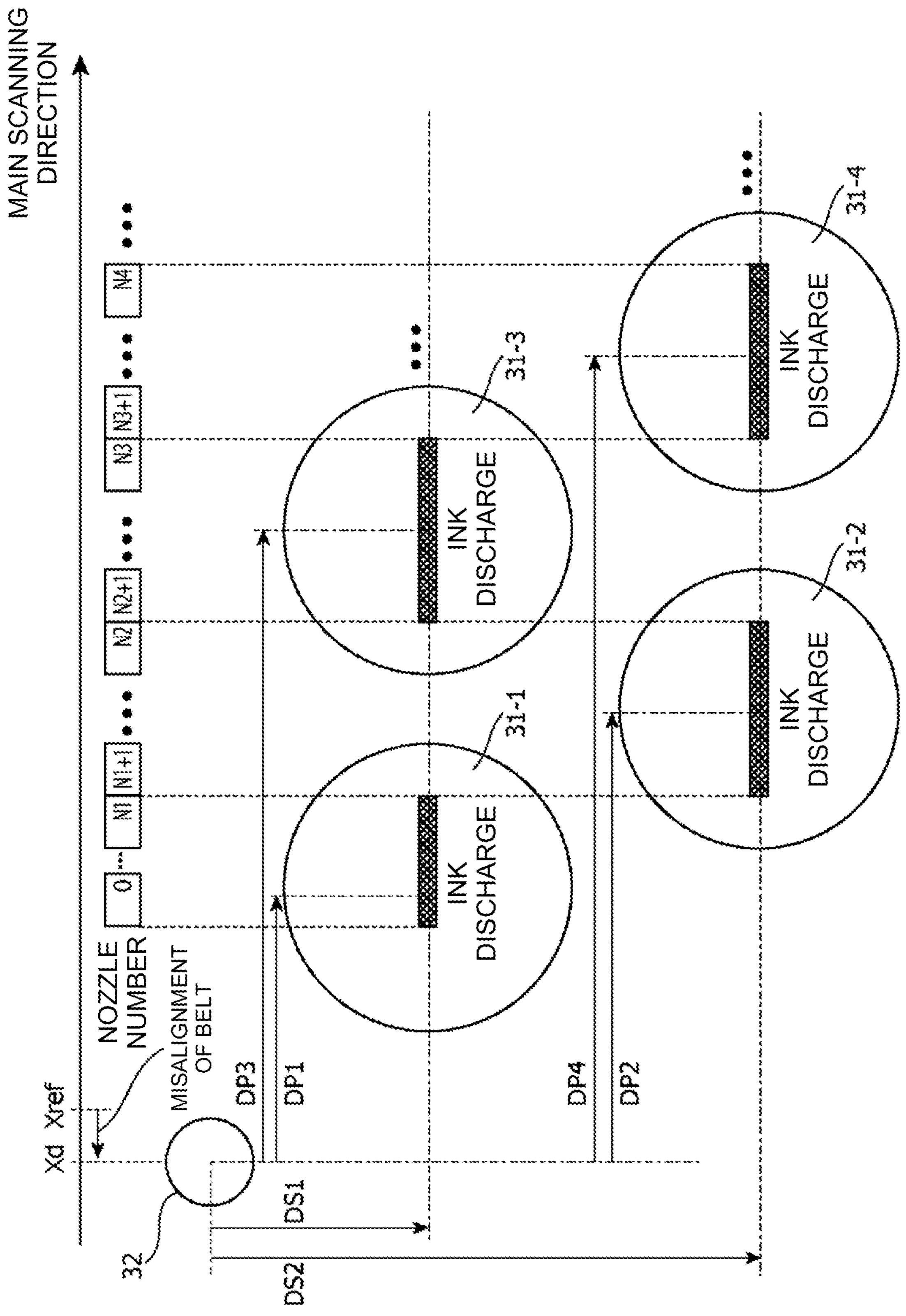
FIG. 6 is a diagram explaining identification of flushing openings corresponding to each nozzle (2/2)

FIGS. 5 and 6 are diagrams illustrating the identification of the flushing openings 31 corresponding to each nozzle.

The discharge timing controller 81*a* (a) detects a position Xd (center position of the detection hole 32) of the detection hole 32 in the main scanning direction with a belt sensor 29, (b) identifies the flushing opening 31-*i* (i=1, 2, . . . , Nf; Nf is the number of the flushing openings 31) corresponding to each nozzle (nozzle number=0, . . . , Nn; Nn is a nozzle number) based on the position Xd of the detected detection hole 32 in the main scanning direction, and (c) causes the print engine 10*a* to perform flushing of the nozzle at a timing corresponding to the flushing opening 31-*i*.

Specifically, the discharge timing controller 81*a* (a) identifies the flushing opening 31-*i* corresponding to the nozzle based on the position Xd of the detection hole 32 in the main scanning direction, the distance DPi from the detection hole 32 to the flushing opening 31-*i* (the center position of the flushing opening 31-*i*), the width of the flushing opening 31-*i* (here, the radius of a circular flushing opening 31-*i*) and the position of the nozzle in the main scanning direction, (b) identifies the discharge timing for flushing of the nozzle (=detection timing of detection hole 32+DSj/linear velocity) based on the detection timing of the detection hole 32, the distance DSj (j=1, 2) from the detection hole 32 to the identified flushing opening 31-*i* in the conveying direction and the linear velocity of conveying belt 2, and (c) causes the print engine 10*a* to execute the flushing of the nozzle at the identified discharge timing. As a result, flushing of the nozzle is performed at the timing when the identified flushing opening 31-*i* arrives at the position directly below the corresponding nozzle.

FIG. 5 shows the case where there is no misalignment of the conveying belt 2 in the main scanning direction. In the case shown in FIG. 5, the position Xd of the detection hole 32 is the reference position Xref, the flushing opening 31-1 corresponds to the nozzles whose nozzle numbers are 0 to Nr1, and the flushing opening 31-2 corresponds to the nozzles whose nozzle numbers are Nr1+1 to Nr2 (similar rule can be applied to the flushing openings 31-3 to 31-Nf).

On the other hand, FIG. 6 shows the case where there is the misalignment of the conveying belt 2 in the main scanning direction. In the case shown in FIG. 6, the position Xd of the detection hole 32 is different from the reference position Xref, so that the flushing opening 31-1 corresponds to the nozzles whose nozzle numbers are 0 to N1 (N1≠Nr1) and the flushing opening 31-2 corresponds to the nozzles whose nozzle numbers are N1+1 to N2 (N2≠Nr2) (similar rule can be applied to the flushing openings 31-3 to 31-Nf).

In this way, the misalignment of the conveying belt 2 is detected by the detection holes 32, so that the nozzles corresponding to each flushing opening 31-*i* are identified by the misalignment being taken into account.

The nozzles (nozzle numbers) corresponding to each flushing opening 31 are individually identified for each inkjet recording part 1*a*-1*d* (i.e., for each ink color).

Next, the operation of the above mentioned image forming apparatus 10 will be explained below.

When printing an image, the discharge timing controller 81*a* controls the print engine 10*a* to discharge ink from the nozzles of inkjet recording parts 1*a*, 1*b*, 1*c*, 1*d* onto the print sheet at ink discharging timing for the pixels in which ink is discharged in the image.

The discharge timing controller 81*a* performs flushing according to specific flushing conditions (such as a lapse of a specific non-use time of the image forming apparatus 10A). At that time, the discharge timing controller 81*a* selects the nozzles (some or all nozzles) to be flushed and performs flushing for the selected nozzles. Specifically, when the conveying belt 2 is circulating, when the detection hole 32 is detected by the belt sensor 29, the discharge timing controller 81*a* identifies the position of the detection hole 32 in the main scanning direction based on the image obtained by the belt sensor 29, identifies the flushing opening 31-*i* corresponding to the selected nozzles, and identifies the flushing timing for each selected nozzles based on the relative position of the identified flushing opening 31-*i* relative to the detection hole 32, and so on. When the flushing timing arrives for each nozzle, the discharge timing controller 81*a* discharges ink to perform flushing.

According to the first embodiment mentioned above, the conveying belt 2 has a plurality of flushing openings 31 and a detection hole 32, and the plurality of flushing openings 31 are arranged in at least two rows along the main scanning direction. The discharge timing controller 81*a* (a) detects the position of the detection hole 32 in the main scanning direction with the belt sensor 29, (b) identifies the flushing opening 31 corresponding to the nozzles based on the position of the detection hole 32 in the main scanning direction, and (c) causes the print engine 10*a* to execute flushing of the nozzles at the timing corresponding to the flushing opening 31.

As a result, even if the conveying belt 2 is misaligned in the main scanning direction when flushing is performed through the flushing openings 31 formed in the conveying belt 2, flushing is properly performed (without ink being discharged on the surface of the conveying belt 2).

Second Embodiment

In a second embodiment, flushing is prohibited when the position (center position) of the detection hole 32 is not accurately identified due to foreign object (such as a piece of paper) adhering to the detection hole 32.

In the second embodiment, the discharge timing controller 81*a* (a) detects the size of the detection hole 32 (size based on the image obtained by the belt sensor 29) with the belt sensor 29, (b1) causes the print engine 10*a* to perform flushing of the nozzles at a timing corresponding to the flushing opening 31-*i* if the detected size meets the specific reference value (that is, the difference (absolute value) between the detected size and the specific reference value is less than a specific value, and (b2) causes the print engine 10*a* not to perform flushing of the nozzles If the detected size does not meets the specific reference value.

Figure 7:
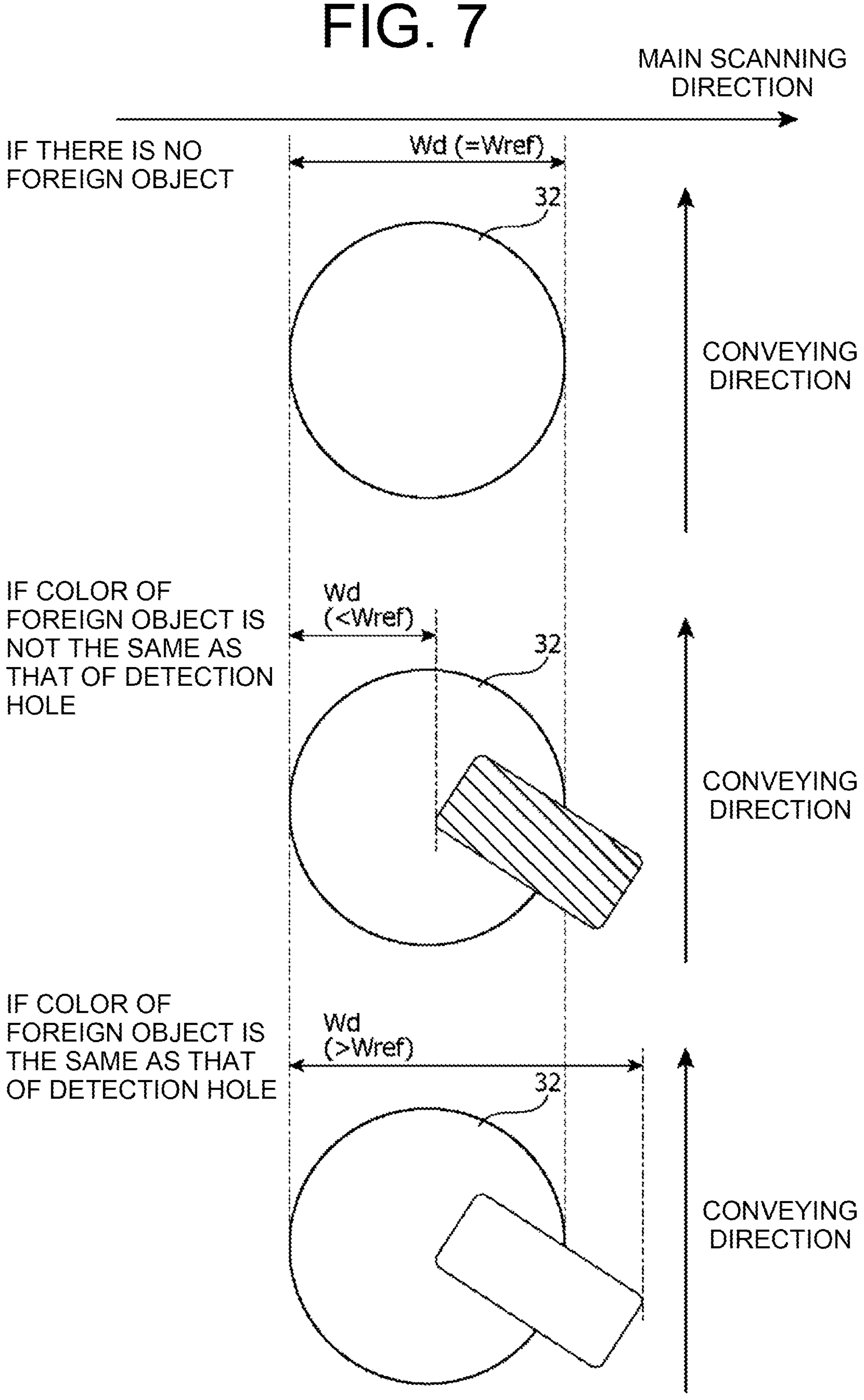
FIG. 7 is a diagram explaining determination of whether or not flushing is performed based on a width of a detection hole in a main scanning direction according to a second embodiment.
Figure 8:
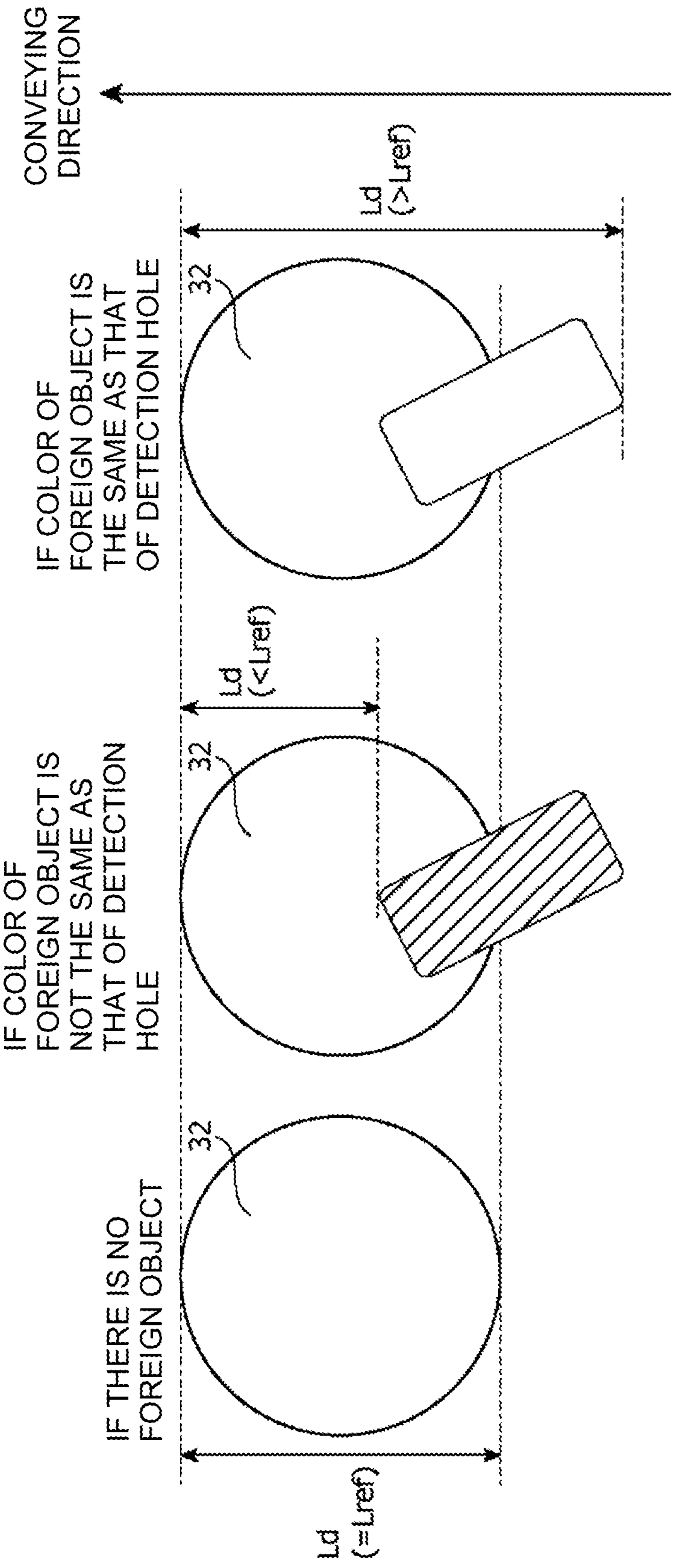
FIG. 8 is a diagram explaining determination of whether or not flushing is performed based on a length of a detection hole in a conveying direction according to a second embodiment.

FIG. 7 is a diagram illustrating the determination of whether or not flushing can be performed based on the width of the detection hole in the main scanning direction according to the second embodiment. FIG. 8 is a diagram illustrating the determination of whether or not flushing can be performed based on the length of the detection holes in the conveying direction according to the second embodiment.

The size of the detection hole 32 described above is, for example, the width Wd of the detection hole 32 in the main scanning direction as shown in FIG. 7, or the length Ld of the detection hole 32 in the conveying direction as shown in FIG. 8.

In the image obtained by the belt sensor 29, if the color of the detection hole 32 is not the same as that of the foreign object, the width Wd or length Ld of the detection hole 32 is detected to be smaller than the specific reference values Wref or Lref (width Wd and length Ld of the detection hole 32 in the absence of the foreign object), as shown in FIGS. 7 and 8, for example.

On the other hand, in the image obtained by the belt sensor 29, if the color of the detection hole 32 is the same as that of the foreign object, the width Wd or length Ld of the detection hole 32 is detected to be larger than the specific reference values Wref and Lref, as shown in FIGS. 7 and 8, for example.

Therefore, if the size of the detected detection hole 32 does not meets the specific reference value, the discharge timing controller 81*a* determines that foreign object (of the same or different color) is attached to the detection hole 32 and prohibits flushing since the position (center position) of the detection hole 32 is not accurately identified and the flushing opening 31-*i* corresponding to each nozzle to be flushed is not accurately identified.

As other configuration and operation of the image forming apparatus according to the second embodiment are identical or similar to those of the first embodiment, the explanations thereof are omitted here.

Third Embodiment

In a third embodiment, the period during which detection of detection holes 32 is attempted is limited so that foreign objects (such as a piece of paper) adhering to the conveying belt 2 are not erroneously detected as detection holes 32.

Figure 9:
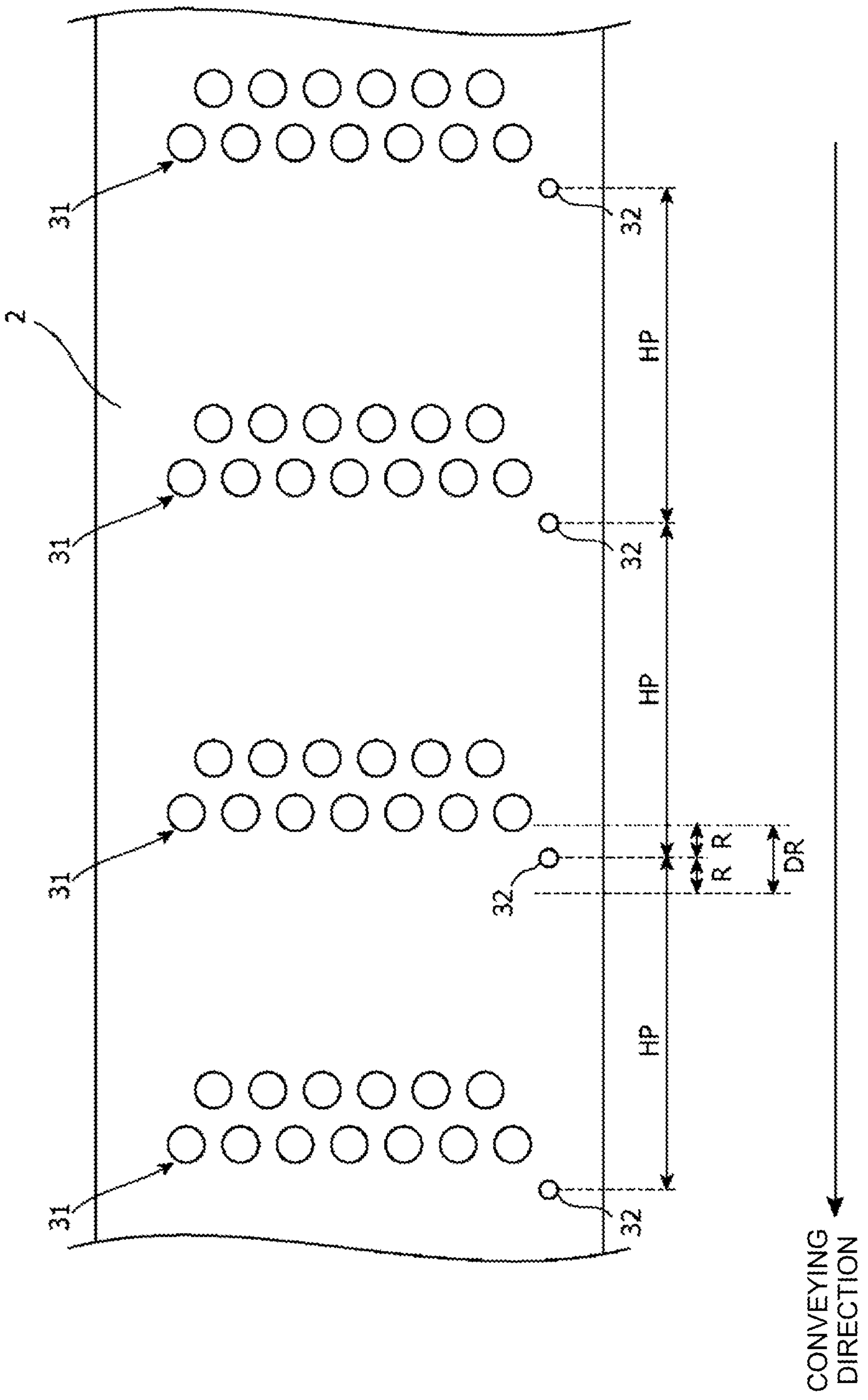
FIG. 9 is a diagram illustrating a detection range of the detection hole according to a third embodiment.

FIG. 9 is a diagram illustrating a detection range of the detection hole 32 according to the third embodiment.

Specifically, as shown in FIG. 9, for example, multiple sets of detection holes 32 and flushing openings 31 are formed on the conveying belt 2. The discharge timing controller 81*a* does not attempt to detect the detection hole 32 during a time period from a timing when the position of a certain detection hole 32 is detected by the belt sensor 29 to a timing when a detection range arrives, which is set for a timing after a detection cycle corresponding to a placement cycle HP of the detection holes 32, and attempts to detect the detection hole 32 in the detection range.

The placement cycle HP is the interval (distance) between the plurality of arranged detection holes 32, and the detection cycle is a time length obtained by dividing the placement cycle HP by a linear velocity of the conveying belt 2.

The temporal detection range corresponds spatially to a range DR of a distance R forward and a distance R backward from the position of the next detection hole 32, as shown in FIG. 9, for example. As detection of the detection hole 32 is not performed outside of the range DR, even if the foreign object of the same color as the detection hole 32 adheres to a position outside of the range DR (substantially at the same position as the detection hole 32 in the main scanning direction) on the image, the foreign object is not erroneously detected as the detection hole 32, so that an inappropriate flushing can be prevented. If the foreign object adheres within the range DR, flushing may be prohibited as described in the second embodiment.

As other configuration and operation of the image forming apparatus according to the third embodiment are identical or similar to those of the first or second embodiment, the explanations thereof are omitted here.

It should be understood that various changes and modifications to the embodiments described herein will be apparent to those skilled in the art. Such changes and modifications may be made without departing from the spirit and scope of the present subject matter and without diminishing its intended advantages. It is therefore intended that such changes and modifications be covered by the appended claims.

For example, in the first to third embodiments mentioned above, instead of providing the above-mentioned detection holes 32 separately from the flushing openings 31, one of the leading flushing openings 31 in the conveying direction may be used as a detection hole.

Furthermore, in the first to third embodiments mentioned above, a line sensor (not shown) to detect the position of the print sheet 101 in the main scanning direction may be used as the belt sensor 29.

For example, the present disclosure can be applied to an inkjet based image forming apparatus.

What is claimed is:

1. An image forming apparatus comprising:

a conveying belt to convey a print sheet;

a print engine including a plurality of nozzles arranged in a main scanning direction to discharge ink from the nozzles onto the print sheet; and a discharge timing controller to control an ink discharge timing of the print engine, wherein the conveying belt has a plurality of flushing openings and a detection hole, the plurality of flushing openings are arranged in at least two rows along the main scanning direction, the discharge timing controller (a) detects a position of the detection hole in the main scanning direction with a sensor, (b) identifies the flushing opening corresponding to the nozzle based on the position of the detected detection hole in the main scanning direction, and (c) causes the print engine to perform flushing of the nozzle at a timing corresponding to the flushing opening, and the discharge timing controller (a) identifies the flushing openings corresponding to the nozzles based on the position of the detection hole in the main scanning direction, a distance from the detection hole to the flushing openings, and a position of the nozzle, (b) identifies the discharge timing for the flushing of the nozzle based on a detection timing of the detection hole, a distance from the detection hole to the identified flushing opening in a conveying direction and a linear velocity of the conveying belt, and (c) causes the print engine to perform the flushing of the nozzle at the identified discharge timing.

2. An image forming apparatus comprising:

a conveying belt to convey a print sheet;

a print engine including a plurality of nozzles arranged in a main scanning direction to discharge ink from the nozzles onto the print sheet; and a discharge timing controller to control an ink discharge timing of the print engine, wherein the conveying belt has a plurality of flushing openings and a detection hole, the plurality of flushing openings are arranged in at least two rows along the main scanning direction, the discharge timing controller (a) detects a position of the detection hole in the main scanning direction with a sensor, (b) identifies the flushing opening corresponding to the nozzle based on the position of the detected detection hole in the main scanning direction, and (c) causes the print engine to perform flushing of the nozzle at a timing corresponding to the flushing opening, and the discharge timing controller (a) detects a size of the detection hole with the sensor, (b1) if the detected size meets a specific reference value, causes the print engine to perform the flushing of the nozzle at a timing corresponding to the flushing opening, and (b2) if the detected size does not meet the specific reference value, does not cause the print engine to perform the flushing of the nozzle.

3. The image forming apparatus according to claim 2, wherein the size is a width of the detection hole in the main scanning direction or a length of the detection hole in the conveying direction.

4. An image forming apparatus comprising:

a conveying belt to convey a print sheet;

a print engine including a plurality of nozzles arranged in a main scanning direction to discharge ink from the nozzles onto the print sheet; and a discharge timing controller to control an ink discharge timing of the print engine, wherein the conveying belt has a plurality of flushing openings and a detection hole, the plurality of flushing openings are arranged in at least two rows along the main scanning direction the discharge timing controller (a) detects a position of the detection hole in the main scanning direction with a sensor, (b) identifies the flushing opening corresponding to the nozzle based on the position of the detected detection hole in the main scanning direction, and (c) causes the print engine to perform flushing of the nozzle at a timing corresponding to the flushing opening, and the discharge timing controller does not attempt to detect the detection hole during a time period from a timing when the position of the detection hole is detected to a timing when a detection range arrives that is set for a timing after a detection cycle corresponding to a placement cycle of the detection holes, and attempts to detect the detection hole in the detection range.

* * * * *